US006904682B2

(12) United States Patent
Takahashi

(10) Patent No.: US 6,904,682 B2
(45) Date of Patent: Jun. 14, 2005

(54) DYNAMIC PRESSURE BEARING AND METHOD OF MANUFACTURING THE SAME

(75) Inventor: Takeshi Takahashi, Nara (JP)

(73) Assignee: Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 10/882,283

(22) Filed: Jul. 2, 2004

(65) Prior Publication Data

US 2004/0237307 A1 Dec. 2, 2004

Related U.S. Application Data

(62) Division of application No. 10/252,381, filed on Sep. 24, 2002, now Pat. No. 6,779,924.

(30) Foreign Application Priority Data

Sep. 25, 2001  (JP) .................................... P2001-290485

(51) Int. Cl.[7] ............................................. F16C 17/02
(52) U.S. Cl. ................................ 29/898.13; 29/898.02
(58) Field of Search .................... 29/898.02, 898.13; 384/114, 120

(56) References Cited

U.S. PATENT DOCUMENTS

| | | | | |
|---|---|---|---|---|
| 5,141,338 A | * | 8/1992 | Asada et al. ............... | 384/114 |
| 5,579,579 A | * | 12/1996 | Chen ......................... | 29/898 |
| 5,988,887 A | * | 11/1999 | Lee ........................... | 384/107 |
| 2004/0027018 A1 | * | 2/2004 | LeBlanc et al. .............. | 310/90 |

FOREIGN PATENT DOCUMENTS

| | | | |
|---|---|---|---|
| JP | 02-304214 | * | 12/1990 |
| JP | 08-247138 | | 9/1996 |
| JP | 11-082479 | | 3/1999 |
| JP | 2001-099159 | | 4/2001 |
| JP | 2001-200846 | | 7/2001 |
| JP | 2002-213435 | * | 7/2002 |
| JP | 2002-339951 | * | 11/2002 |

* cited by examiner

Primary Examiner—Eric Compton
(74) Attorney, Agent, or Firm—McGinn & Gibb, PLLC

(57) ABSTRACT

In a dynamic pressure bearing, when a step portion (1a) is formed on the inner peripheral surface (1b) of a sleeve (1) and radial dynamic pressure grooves (3) are formed on the inner peripheral surface of the step portion, the width (L) in the axial direction of the dynamic pressure grooves is set to be slightly smaller than the width (D) in the axial direction of the step portion. The dynamic pressure grooves of the sleeve are formed by electrolytic etching.

4 Claims, 7 Drawing Sheets

DYNAMIC PRESSURE BEARING AND METHOD OF MANUFACTURING THE SAME

The present Application is a Divisional Application of U.S. patent application Ser. No. 10/252,381 filed on Sep. 24, 2002, now U.S. Pat. No. 6,779,924.

BACKGROUND OF THE INVENTION

The present invention relates to a dynamic pressure bearing, and particularly to a dynamic pressure bearing having dynamic pressure grooves formed on the inner peripheral surface of a sleeve in which a shaft is fitted, which has high precision, reduces the manufacturing cost and has a lower bearing damage rate, and a method of manufacturing the dynamic pressure bearing.

A dynamic pressure bearing, in which a shaft is fitted in a sleeve and relatively rotated and herringbone type or spiral type grooves are formed on at any one of the inner peripheral surface of the sleeve and the outer peripheral surface of the shaft, is used as a bearing apparatus for a spindle motor rotating at high speed in information equipment or the like.

For example, as shown in FIG. 9, there is used such a dynamic pressure bearing that herring bone type dynamic pressure grooves 23 are formed on the inner peripheral surface of a sleeve 21 on which a stator coil 21 is mounted, a shaft 25 is fitted in the sleeve 21 so that a ferromagnetic material (not shown) is disposed to face the stator coil 20 and the stator coil 20 is supplied with current to rotate the shaft 25 at high speed. Such a dynamic pressure bearing is used in an apparatus in which a polygon mirror or optical disc (not shown) is fixed to the shaft 25 and a laser beam is reflected therefrom to record or read out information.

On the inner peripheral surface 21b of the sleeve 21, a bearing portion 22 is equipped at a step portion 21a having a slightly reduced diameter, and herringbone type or spiral type V-shaped dynamic pressure grooves 23 are formed on the inner surface of the bearing portion 22 of the step portion 21a as shown in FIGS. 10 and 11. Alternatively, dynamic pressure grooves may be formed on the outer peripheral surface of the shaft 25 in place of formation of the dynamic pressure grooves 23 on the inner peripheral surface of the sleeve 21. Such dynamic pressure grooves 23 are usually formed by plastic working based on form rolling. Further, there is known an example of forming dynamic pressure grooves by using an electrolytic etching working in order to satisfy recent requirements for high precision and increase of working speed. In the case of stainless steel, etc., etching working on these materials needs much time. Therefore, there has been proposed a dynamic pressure bearing achieved by subjecting a bearing face of a sleeve of aluminum alloy to plastic working based on ball form rolling and carrying out an alumite treatment after honing working, thereby forming an anode oxidation coating (Japanese Laid-open Patent Application No. Hei-8-247138).

To overcome lack of lubricating oil in bearing gaps to enhance durability and bearing rigidity, such a dynamic pressure bearing is proposed that it includes dynamic pressure grooves formed on the inner peripheral surface of the sleeve, lubricating oil or grease is impregnated in the bearing body 31, and dynamic pressure grooves 33 are formed to be inclined with respect to the bearing face of the bearing body as shown in FIG. 12A (Japanese Laid-open Patent Application No. Hei-11-82479). According to the bearing apparatus thus constructed, the rotational shaft is supported under anon-contact state by dynamic pressure films of the lubricating oil formed in the bearing gaps, and the lubricating oil is circulated between the inside of the bearing body 32 and each bearing gap through opening portions of the bearing face. In this case, as shown in FIG. 12B, each dynamic pressure groove 33 comprises one oblique groove 33a, the other oblique groove 33b and a smoothing portion 34 formed between the oblique grooves 33a and 33b.

As described above, the dynamic pressure grooves 23 of the bearing portion 22 equipped at the step portion 21a of the inner peripheral surface of the conventional sleeve 21 are formed over the whole width D from one end portion 21c of the step portion 21c to the other end portion of the step portion 21c. Therefore, as shown in FIG. 11, particularly when the shaft 25 is rotated in a bell-shaped mode (conical mode or precession mode) at the start or stop time of the motor, the shaft 25 damages the end portions 21c of the step portion 21a. If the end portions 21c of the step portion 21a at which the bearing portion 22 is equipped are repetitively damaged due to rotation of the shaft 25 in such a conical mode as described above, the performance as the dynamic pressure bearing is degraded, and finally it adversely affects the performance and lifetime of equipment equipped with such a dynamic pressure bearing.

According to the conventional technique, after dynamic pressure grooves 23 are formed on the inner peripheral surface of a sleeve by the plastic working based on the form rolling as described above, it is required to carry out finish machining by reaming, balling, horning or the like, so that the manufacturing cost is high.

The etching process used as a work to form dynamic pressure grooves has high precision, however, it still needs a high manufacturing cost. Further, dynamic pressure grooves may be formed by the electrolytic etching processing. However, the conventional processing has a problem that pattern symmetry is lost unless the positioning to a work is not performed at high precision, so that fluid flow occurs.

SUMMARY OF THE INVENTION

The present invention has been implemented to overcome the foregoing problem, and has an object to provide a dynamic pressure bearing which can reduce damages of dynamic pressure grooves even when a shaft has a swinging motion in a conical mode, simplify the positioning (precision) to keep symmetry in an electrolytic etching process and exhibit high performance, and a method of manufacturing the dynamic pressure bearing.

In order to solve the aforesaid object, the invention is characterized by having the following arrangement.

(1) A dynamic pressure bearing comprising:
   a sleeve;
   a bearing portion formed on an inner peripheral surface of the sleeve, wherein a diameter of an inner peripheral surface of the bearing portion is smaller than the inner diameter of the sleeve; and
   dynamic pressure grooves formed on a part of the inner peripheral surface of the bearing portion, wherein the dynamic pressure groove is not formed at opposite end portions of the bearing portion.

(2) A method of manufacturing a dynamic pressure bearing including a sleeve; a bearing portion formed on an inner peripheral surface of the sleeve, having a predetermined width, wherein the diameter of the inner peripheral surface of the bearing portion is smaller than the inner diameter of the sleeve; and dynamic pressure grooves formed on a part of the inner peripheral surface of the bearing portion, wherein the dynamic pressure groove is not formed at opposite end portions of the bearing portion, the method comprising the step of:

subjecting the sleeve to electrolytic etching to form the dynamic pressure groove.

(3) A dynamic pressure bearing comprising:
a sleeve;
a bearing portion formed on an inner peripheral surface of the sleeve, having a first width in an axial direction, wherein a diameter of an inner peripheral surface of the bearing portion is smaller than an inner diameter of the sleeve; and
dynamic pressure groove formed on the inner peripheral surface of the bearing portion, having a second width in the axial direction smaller than the first width.

(4) The dynamic pressure bearing according to (3), wherein the dynamic pressure groove is not formed at opposite end portions of the bearing portion.

(5) The dynamic pressure bearing according to (3), wherein a center line of the first width is coincident with a center line of the second width.

DETAILED DESCRIPTION OF THE PREFERRED EMBODIMENTS

Preferred embodiments according to the present invention will be described hereunder with reference to the accompanying drawings.

Figure 1:
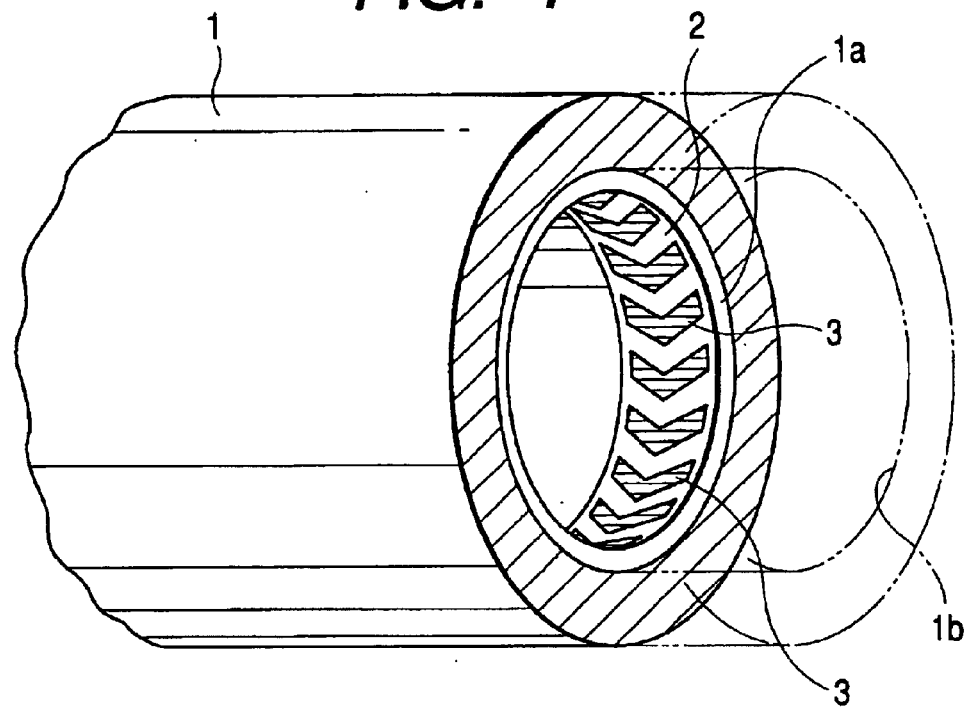
FIG. 1 is a partially perspective view showing a sleeve constituting a dynamic pressure bearing according to the present invention.
Figure 2:
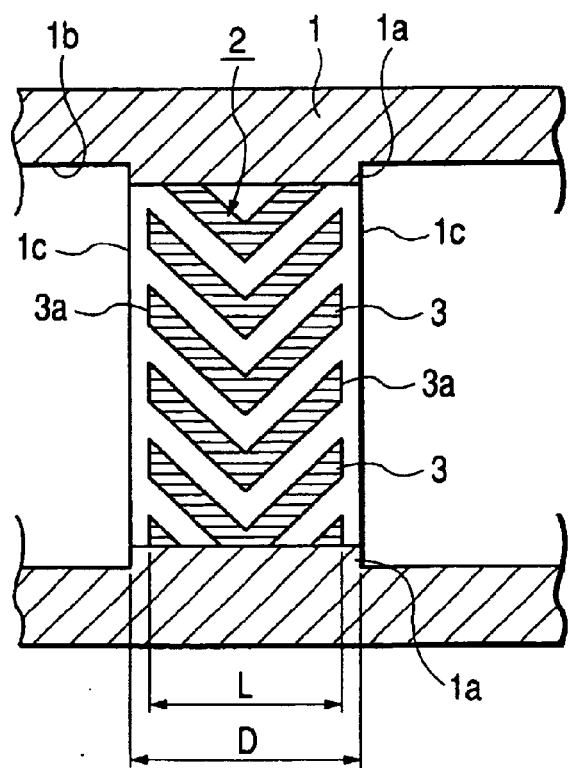
FIG. 2 is a cross-sectional view in the axial direction of the sleeve constituting the dynamic pressure bearing according to the present invention.

FIG. 1 is a partially perspective view showing a sleeve 1 constituting a dynamic pressure bearing according to the present invention, and FIG. 2 is a cross-sectional view in the axial direction of the sleeve 1.

Figure 9:
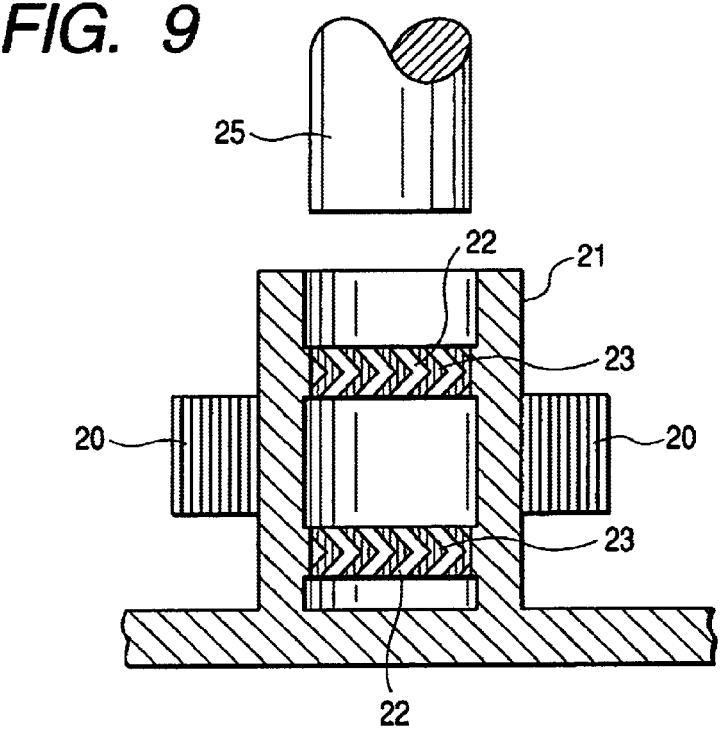
FIG. 9 is a diagram showing the construction of a conventional dynamic pressure bearing used for a spindle motor.
Figure 10:
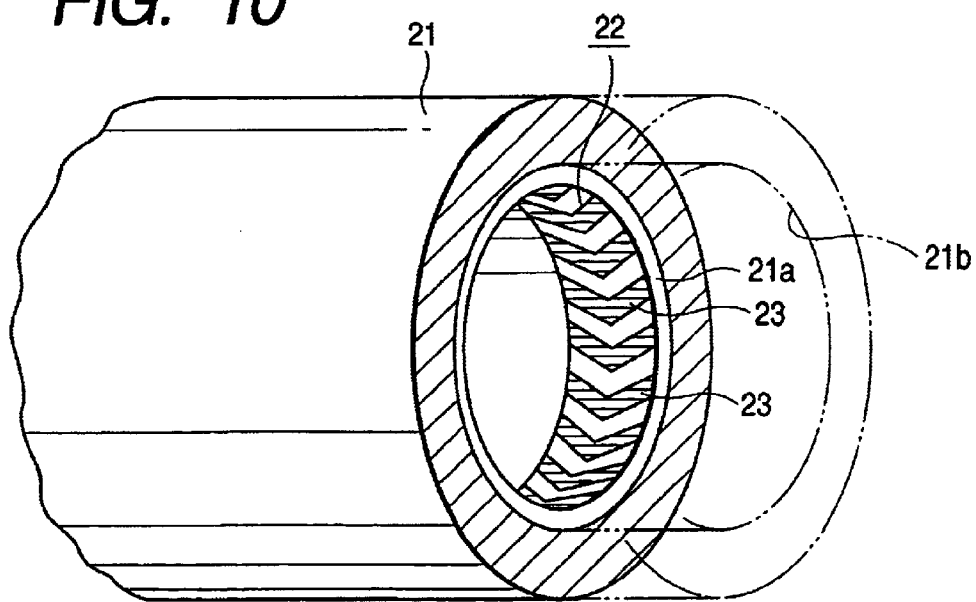
FIG. 10 is a partially perspective view showing a sleeve constituting the conventional dynamic pressure bearing.
Figure 11:
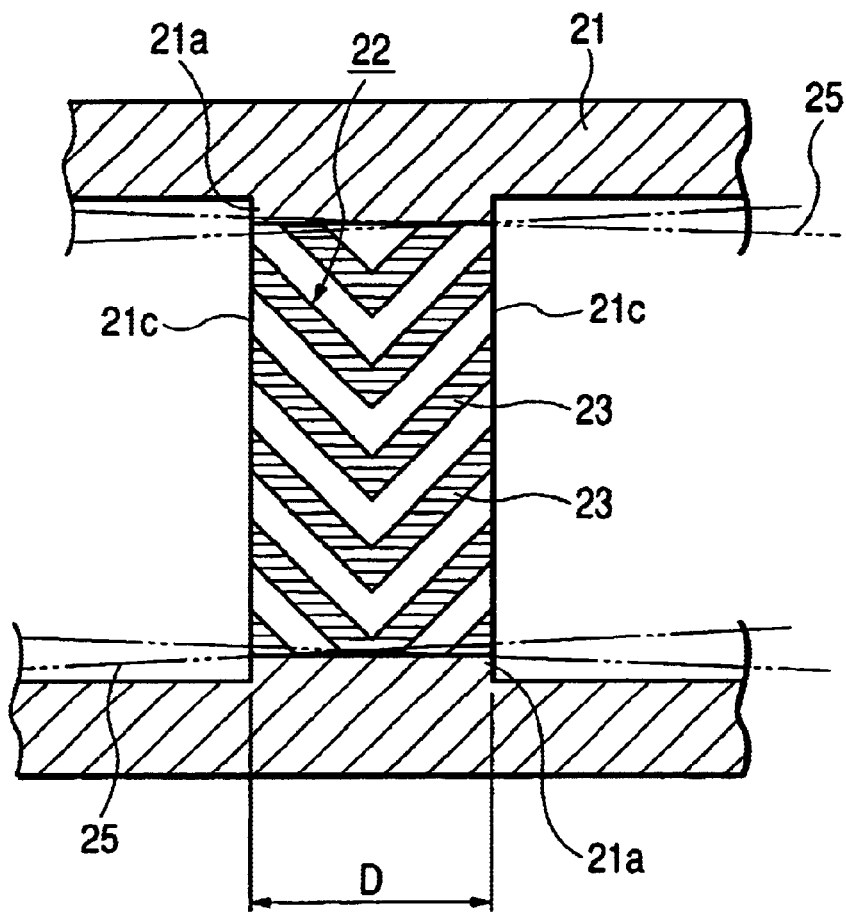
FIG. 11 is a cross-sectional in the axial direction of the sleeve constituting the conventional dynamic bearing.
Figure 12A:
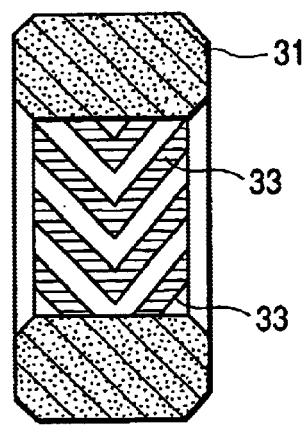
FIG. 12A is a cross-sectional view showing the sleeve constituting the conventional dynamic pressure bearing.
Figure 12B:
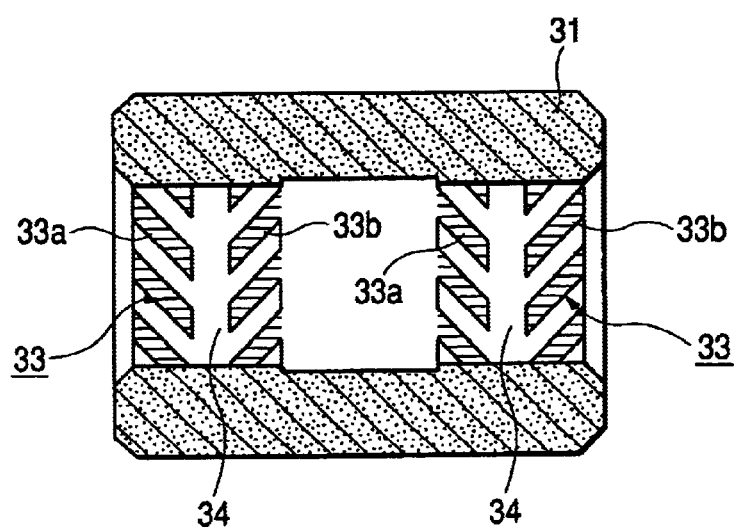
FIG. 12B is a cross-sectional view showing the sleeve of the conventional dynamic pressure bearing, which is also a cross-sectional view when a dynamic bearing portion is equipped at two places.

As shown in FIGS. 1 and 2, a step portion 1a having a predetermined width is formed on the inner peripheral surface 1b of the sleeve 1 so that the diameter of the inner peripheral surface thereof is smaller than the inner diameter of the sleeve 1, and a bearing portion 2 is formed on the inner peripheral surface of the step portion 1a. Herringbone type dynamic pressure grooves 3 are formed at the bearing portion 2. The dynamic pressure grooves 3 may be designed in a spiral type or V-shape type. In this case, the width L of the dynamic pressure grooves 3 in the axial direction of the sleeve is slightly smaller than the width D of the step portion 1a (L<D). A shaft 25 (see FIGS. 9 and 11) is inserted and fit in the inner diameter portion of the sleeve, thereby constituting a bearing portion of a spindle motor, for example. Accordingly, an inner peripheral surface on which no dynamic pressure groove 3 is formed exists at both the end portions of the bearing portion 2 formed on the inner peripheral surface of the step portion 1a.

In the dynamic pressure bearing of the present invention, since the width L in the axial direction of the dynamic pressure grooves 3 is smaller than the width D in the axial direction of the step portion 1a on the inner peripheral surface of the sleeve 1, the performance of the bearing portion 2 would suffer no adverse effect even if the shaft comes into contact with the end portion 1c of the step portion 1a. That is, the conventional dynamic pressure bearing shown in FIG. 11 has the problem that the shaft 25 comes into contact with the end portions 21c of the step portion 21a and thus damages the dynamic pressure grooves 3 due to the swinging motion (precession or the like) of the shaft 25 when the motor is started or stopped. However, according to the dynamic pressure bearing of the present invention, even when the shaft makes a swinging motion (precession or the like), the dynamic pressure grooves 3 have no damage because each of both the end portions 1c of the step portion 1a and the end portion 3a of each dynamic pressure groove 3 are spaced away from each other at a fixed distance through a flat portion. Accordingly, the pattern symmetry of the dynamic pressure grooves 3 is prevented from being lost and occurrence of fluid flow is prevented, so that the performance of the dynamic pressure bearing 2 suffers no effect.

Next, a method of forming the dynamic pressure grooves 3 on the inner peripheral surface of the sleeve 1 will be described.

Figure 3:
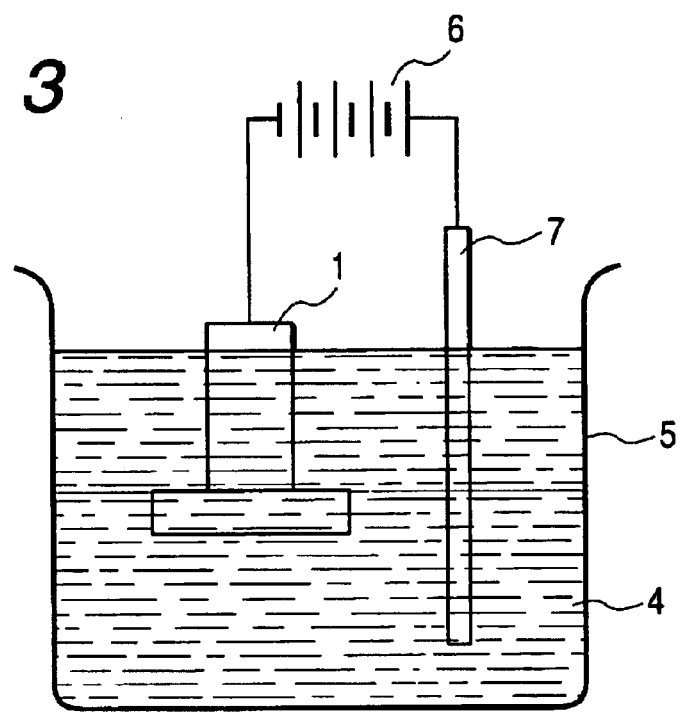
FIG. 3 is a diagram showing the construction of a resist electrode position apparatus to form a resist, which is a pre-treatment stage to form dynamic pressure grooves on the inner peripheral surface of the sleeve constituting the dynamic pressure bearing according to the present invention.

FIG. 3 shows the construction of a resist electrode position apparatus for a resist forming process, which corresponds to a pre-treatment stage to form the dynamic pressure grooves 3 on the inner peripheral surface of the step portion 1a equipped on the inner peripheral surface of the sleeve 1.

As shown in FIG. 3, the resist electrode position apparatus includes an electrodeposition tank 5, resist-component containing electrodeposition liquid 4 stocked in the electrodeposition tank 5 and a power source 6 having a cathode and an anode. The sleeve 1 is connected to the cathode side of the power source 6 and immersed in the electrodeposition liquid 4. A positive electrode rod 7 is connected to the anode side.

Figure 4:
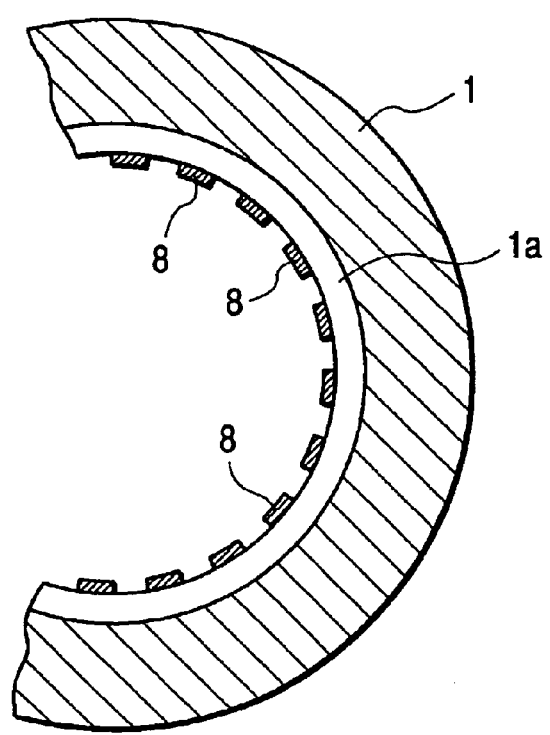
FIG. 4 is a diagram showing a method of manufacturing the dynamic pressure bearing according to the present invention, which is a cross-sectional view showing the sleeve under the state that insulating material is coated on a pattern of the dynamic pressure grooves by printing or masking corresponding to a pre-treatment processing method for the dynamic pressure grooves to be formed by electrolytic etching.

FIG. 4 shows a pre-treatment processing method of the dynamic pressure grooves 3 on the basis of electrolytic etching.

First, a pattern of the dynamic pressure grooves 3 is printed on the inner peripheral surface of the sleeve 1 connected to the cathode side by coating insulating material 8. This printing may be performed by using paper pattern or mask which is designed in conformity with the inner diameter of the step portion 1a formed on the inner peripheral surface of the sleeve 1, or by using relief printing, offset printing or the like.

Figure 5:
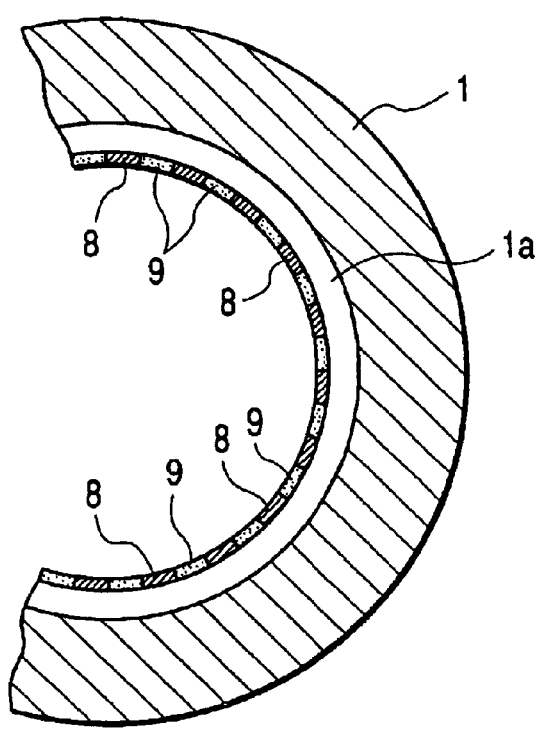
FIG. 5 is a diagram showing the method of manufacturing the dynamic pressure bearing according to the present invention, which is a cross-sectional view showing the state that a resist is electrically deposited on the sleeve coated with the insulating material.
Figure 6:
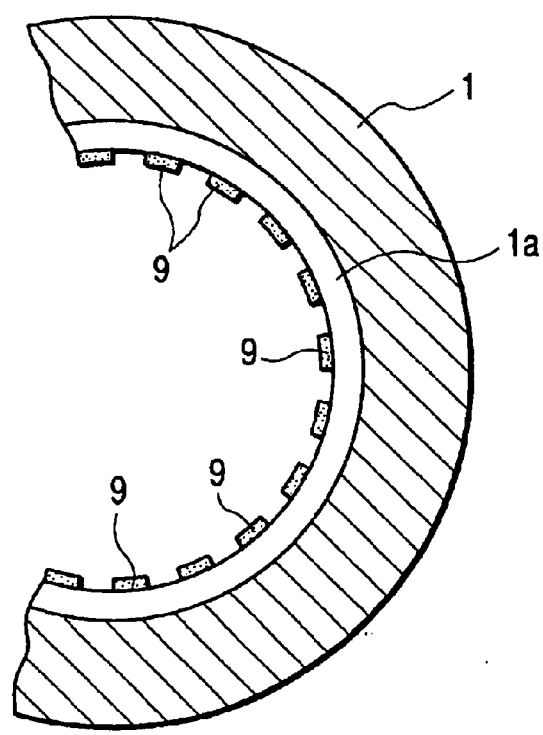
FIG. 6 is a diagram showing the method of manufacturing the dynamic pressure bearing according to the present invention, which is a cross-sectional view of the sleeve before the insulating material coated on the inner peripheral surface of the sleeve is removed to form the pattern of the dynamic pressure grooves and put into an electrolytic etching apparatus.

When the sleeve 1 thus coated with the insulating material 8 as the pattern of the dynamic pressure grooves 3 is connected to the cathode side of the power source, the positive electrode rod 7 is connected to the anode side and current flows into the sleeve 1, an electrodeposition resist layer 9 is formed at portions other than the portions coated with the insulating material 8 as shown in FIG. 5. By removing the insulating material 8 under this state, an etching pattern is formed by the electrodeposition resist layer as shown in FIG. 6. In place of formation of the insulating material 8, there may be used a method of forming a resist layer 9 on the whole inner peripheral surface of the step portion 1a without forming any insulating material 8 and then removing an etching pattern portion corresponding to the dynamic pressure grooves 3 from the resist layer 9 by a laser, thereby forming an etching pattern.

Next, the electrolytic etching method will be described.

Figure 7:
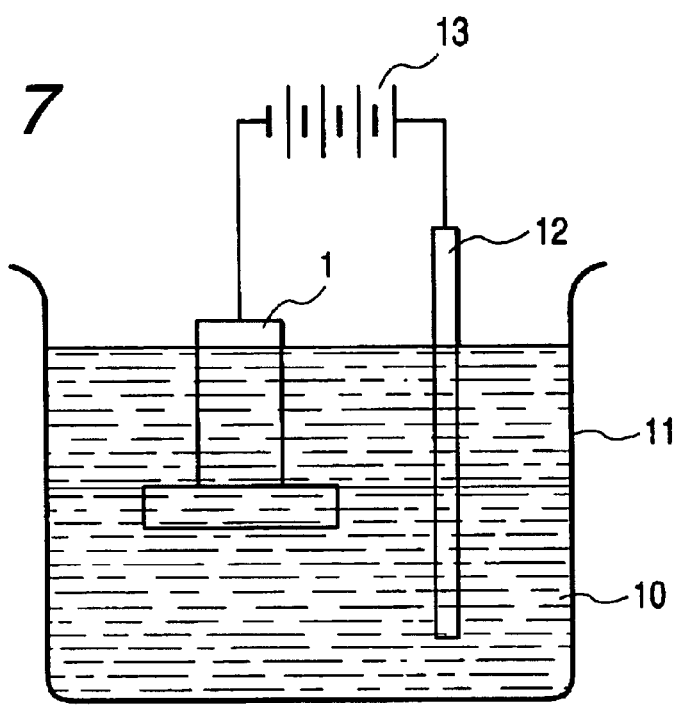
FIG. 7 is a diagram showing the construction of the electrolytic etching apparatus when electrolytic etching is carried out on the sleeve having the etching pattern of the dynamic pressure grooves.
Figure 8:
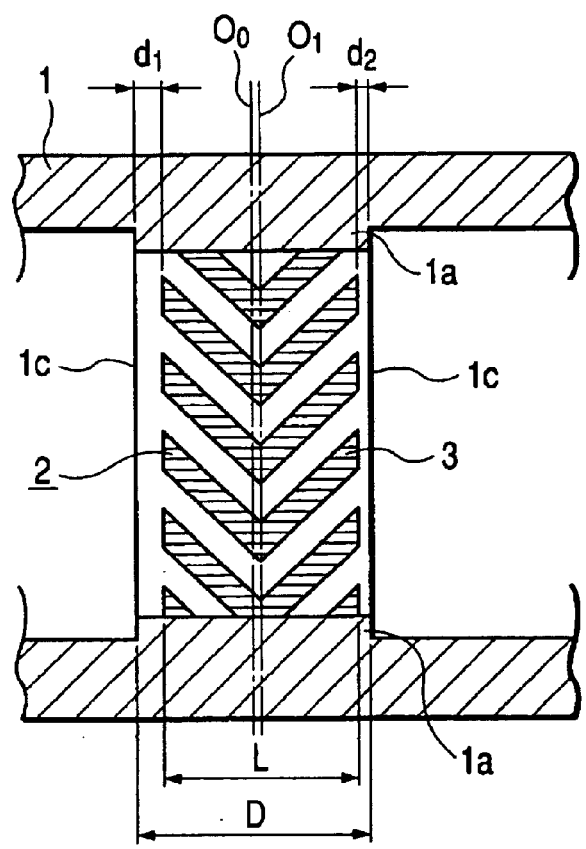
FIG. 8 is a cross-sectional view in the axial direction of the sleeve constituting the dynamic pressure bearing according to the present invention.

FIG. 7 shows the construction of an electrolytic etching apparatus when electrolytic etching is conducted on the sleeve 1 having the etching pattern of the dynamic pressure grooves formed thereon.

The electrolytic etching apparatus includes an electrolytic tank 11, electrolytic liquid 10 stocked in the electrolytic tank 11, and a power source 13 connected to the sleeve 1 at the anode side thereof and to an electrode rod 12 at the cathode side thereof. Electrolytic liquid 10 such as sodium chloride (NaCl), sodium nitrate (NaNO$_3$) or the like is stocked in the electrolytic tank 11. When the sleeve 1 having a predetermined pattern of dynamic pressure grooves 3 is immersed in the electrolytic liquid 10 and current is made to flow into the sleeve 1, only the metal surface of the sleeve 1 on which the pattern of the dynamic pressure grooves 3 is formed is dissolved through an electrolytic reaction to form the dynamic pressure grooves 3. Thereafter, by removing the electrodeposition layer 9, the dynamic pressure grooves based on the electrolytic etching method are formed.

As described above, in the dynamic pressure bearing of the present invention, the dynamic pressure grooves 3 are formed on the inner peripheral surface of the step portion 1a of the sleeve 1 by the above method, and the width L in the axial direction of the dynamic pressure grooves 3 is set to be slightly smaller than the width D in the axial direction of the step portion 1a. In this case, it is ideal that the center line $O_1$ of the width L in the axial direction of the dynamic pressure grooves 3 is coincident with the center line $O_0$ of the width in the axial direction of the step portion 1a. However, in the case of the present invention, the performance of the dynamic pressure bearing 2 suffers no adverse effect even if the center line $O_1$ of the width L in the axial direction of the dynamic pressure grooves 3 cannot be made coincident with the center line $O_0$ of the width D in the axial direction of the step portion 1a and thus there exists some displacement therebetween. That is, even if there exists some displacement between the center line $O_1$ of the width L and the center line $O_0$ of the width D on the inner peripheral surface of the sleeve 1, the width L in the axial direction of the dynamic pressure grooves 3 is slightly smaller than the width D in the axial direction of the step portion 1a and thus this displacement (for example, the center of the dynamic pressure grooves 3 is somewhat displaced) has no effect on the performance of the dynamic pressure bearing.

As described above, according to the dynamic pressure bearing of the present invention, the end portions of the dynamic pressure grooves are designed to be flat, so that the bearing performance is not degraded even if the shaft is rotated in the conical mode. Further, even if the shaft abuts against the bearing when the shaft is rotated, the damage imposed on the dynamic pressure bearing is reduced.

Further, The method of manufacturing the dynamic pressure bearing is based on the electrolytic etching method, however, the symmetry of the dynamic pressure grooves is determined by the electrode. Therefore, the positioning precision of the work and the electrode during the processing is simplified, and also unlike the conventional technique, it is unnecessary to carrying out the processing while the positioning precision of the electrode with respect to the work is kept high.

Still further, according to the electrolytic processing method of the present invention, there occurs no flash due to return or the like unlike the manufacturing method based on the form rolling, and thus a post-processing step is unnecessary, so that the number of processing steps can be reduced and thus the manufacturing cost can be reduced.

Still further, the symmetry of the dynamic pressure grooves is not lost even by the rotation of the shaft in the conical mode, and thus no fluid flow occurs.

What is claimed is:

1. A method of manufacturing a dynamic pressure bearing including a sleeve; a bearing portion formed on an inner peripheral surface of the sleeve, having a predetermined width, wherein the diameter of the inner peripheral surface of the bearing portion is smaller than the inner diameter of the sleeve; and a dynamic pressure groove formed on a part of the inner peripheral surface of the bearing portion, wherein the dynamic pressure groove is not formed at opposite end portions of the bearing portion, the method comprising:

subjecting the sleeve to electrolytic etching to form the dynamic pressure groove.

2. The method according to claim 1, wherein a plurality of the dynamic pressure grooves are formed on the part of the inner peripheral surface of the bearing portion.

3. The method according to claim 1, wherein electrolytic liquid for the electrolytic etching includes sodium chloride or sodium nitrate.

4. The method according to claim 1, wherein for the sleeve prior to being subjected to the electrolytic etching, a resist layer is formed on the inner peripheral surface of the sleeve other than an etching pattern portion of the dynamic pressure groove.

* * * * *